United States Patent
Stadtfeld et al.

(10) Patent No.: US 9,649,707 B2
(45) Date of Patent: May 16, 2017

(54) SLIDE ROLLING PROCESS FOR THE GENERATION OF BEVEL GEARS

(71) Applicant: THE GLEASON WORKS, Rochester, NY (US)

(72) Inventors: Hermann J. Stadtfeld, Webster, NY (US); Joseph A. Courtney, Rochester, NY (US); Mark J. Boch, East Rochester, NY (US); William G. Landry, Canandaigua, NY (US)

(73) Assignee: THE GLEASON WORKS, Rochester, NY (US)

( * ) Notice: Subject to any disclaimer, the term of this patent is extended or adjusted under 35 U.S.C. 154(b) by 0 days.

(21) Appl. No.: 14/766,859

(22) PCT Filed: Feb. 18, 2014

(86) PCT No.: PCT/US2014/016795
§ 371 (c)(1),
(2) Date: Aug. 10, 2015

(87) PCT Pub. No.: WO2014/130415
PCT Pub. Date: Aug. 28, 2014

(65) Prior Publication Data
US 2015/0375319 A1 Dec. 31, 2015

Related U.S. Application Data

(60) Provisional application No. 61/766,144, filed on Feb. 19, 2013.

(51) Int. Cl.
*B23F 9/10* (2006.01)
*B23F 5/20* (2006.01)

(52) U.S. Cl.
CPC .............. *B23F 9/105* (2013.01); *B23F 5/207* (2013.01); *B23F 9/10* (2013.01); *B23F 5/20* (2013.01);
(Continued)

(58) Field of Classification Search
CPC . Y10T 409/103816; Y10T 409/103975; Y10T 409/104134; Y10T 409/104293;
(Continued)

(56) References Cited

U.S. PATENT DOCUMENTS 676,226 A * 6/1901 Fellows ................. B23F 21/10
407/28
1,364,056 A * 12/1920 Farnum .................. B23F 9/105
409/25
(Continued)

FOREIGN PATENT DOCUMENTS

GB 694878 A 7/1953

OTHER PUBLICATIONS

International Search Report and Written Opinion for PCT/US2014/016795, ISA/EPO, Jul. 17, 2014, pp. 1-10.

*Primary Examiner* — Daniel Howell
*Assistant Examiner* — Yasir Diab
(74) *Attorney, Agent, or Firm* — Robert L. McDowell (57) ABSTRACT

Generating cutting processes for producing bevel gears and employing a single rotary disc cutter (36) wherein a portion of the generating cutting process effectively includes a reduction (38) of the workpiece roll angle (40) during generating thereby reducing or eliminating cutting action on the clearance side (42) of the rotary disc cutter.

13 Claims, 6 Drawing Sheets

(52) U.S. Cl.
CPC ..... *B23F 5/202* (2013.01); *Y10T 409/103816* (2015.01); *Y10T 409/103975* (2015.01); *Y10T 409/104134* (2015.01); *Y10T 409/104293* (2015.01); *Y10T 409/104452* (2015.01)

(58) Field of Classification Search
CPC ... Y10T 409/104452; B23F 5/20; B23F 5/202
See application file for complete search history.

(56) References Cited

U.S. PATENT DOCUMENTS

| | | | | |
|---|---|---|---|---|
| 1,429,398 | A * | 9/1922 | Barth | B23F 5/14 409/47 |
| 2,200,412 | A * | 5/1940 | Carlsen | B23F 21/245 409/26 |
| 2,248,158 | A * | 7/1941 | Boor | B23F 9/10 409/25 |
| 2,310,484 | A | 2/1943 | Wildhaber | |
| 2,372,241 | A * | 3/1945 | Wildhaber | B23F 9/10 409/26 |
| 4,565,474 | A * | 1/1986 | Charles | B23F 5/20 409/38 |
| 4,720,220 | A * | 1/1988 | Bloch | B23F 21/083 407/118 |
| 7,156,718 | B2 * | 1/2007 | Blasberg | B23F 9/10 451/47 |
| 2008/0085166 | A1 * | 4/2008 | Stadtfeld | B23F 5/207 409/2 |

* cited by examiner

SLIDE ROLLING PROCESS FOR THE GENERATION OF BEVEL GEARS

This application claims the benefit of U.S. Provisional Patent Application No. 61/766,144 filed Feb. 19, 2013, the entire disclosure of which is hereby incorporated by reference.

FIELD OF THE INVENTION

The invention is directed to the production of gears and in particular to the generation of straight bevel gears utilizing rotary disc cutters.

BACKGROUND OF THE INVENTION

It is known to produce straight bevel gears, as well as skew bevel gears, face couplings and splined parts, by providing a pair of inclined rotary cutting tools whose rotating cutting blades effectively interlock to simultaneously cut the same tooth space on a workpiece. Examples of this type of machining can be seen, for example, in U.S. Pat. No. 2,586,451 to Wildhaber; U.S. Pat. Nos. 2,567,273 and 2,775,921 to Carlsen; U.S. Pat. No. 2,947,062 to Spear or in the company brochure "Number 102 Straight Bevel Coniflex® Generator" published by The Gleason Works.

Straight bevel gears may be formed by a non-generating process where the inclined tools are plunged into the workpiece to form a tooth slot with the profile surface of the tooth being of the same form as that of the blade cutting edge. Alternatively, tooth surfaces may be generated wherein the inclined tools are carried on a machine cradle which rolls the tools together with the workpiece via a generating roll motion to form a generated profile surface on the workpiece. In either instance, the tools may also include cutting edges that are disposed at a slight angle (e.g. 3°) to the plane of cutter rotation. Such an angled cutting edge, in conjunction with the inclination of the tools, removes more material at the ends of a tooth slot thereby resulting in lengthwise curvature of the tooth surface (i.e. lengthwise ease-off) for tooth bearing localization.

Bevel and hypoid gears can be cut in a single indexing process (face milling) or in a continuous indexing process (face hobbing). A basic cutting setup in the generating or cradle plane will put the center of the cutter head in a position which is away from the generating gear center (cradle axis) by the amount known as the radial distance. The silhouette of the cutter blades represents one tooth of the generating gear while the cutter rotates. Common face cutters for bevel gear cutting have several blade groups with each group having between one and four blades. Most common are alternating (completing) cutters with one outside and one inside blade. Peripheral cutter heads for the manufacture of straight bevel gears according to the above-described interlocking cutters method use only one kind of blades (e.g. outside blades) which have been used on conventional mechanical machines in the past.

On modern CNC machines, such as those machines known as 6-axis or free-form machines and disclosed by, among others, U.S. Pat. No. 6,715,566 the disclosure of which is hereby incorporated by reference, only one cutter from the above-discussed interlocking pair of cutters is used to cut a first tooth flank in a lower cutting position and, with the same cutter, also cut a second tooth flank in an upper cutting position in a single indexing process as disclosed in, for example, U.S. Pat. No. 7,364,391 the disclosure of which is hereby incorporated by reference. The cutting of the first flank faces the problem that material has to be removed not only on the cutting edge but also on the clearance edge of the blade. The result is high part temperature, poor cutting performance and low tool life. In a combined process, of vector feed and rolling, the clearance side of the blades during the first slot cutting can be moved away from the material which protects the clearance side of the cutting edge. However, a vector feed in straight bevel gear cutting has to use a very steep angle (only few degrees away from the blades center line) which makes the blade tip subject of severe chip removing loads. This leads to early failure of the blade tips and therefore results in low tool life.

Similar conditions occur if in a face cutting process only one kind of blades is used (e.g. inside blades only or full profile blades). The cutting blades will only be optimal on one side for high amounts of chip removal, which increases part temperature and reduces tool life.

SUMMARY OF THE INVENTION

The invention is directed to generating cutting processes for producing bevel gears and employing a single rotary disc cutter wherein a portion of the generating cutting process effectively includes a reduction of the workpiece roll angle during generating thereby reducing or eliminating cutting action on the clearance side of the rotary disc cutter.

BRIEF DESCRIPTION OF THE DRAWINGS

FIG. 8 shows the work and the cutter from FIG. 7 rotated in clockwise direction by an angle α in order to receive a horizontal cutter axis. FIG. 8 shows a number of radii and angles which are used in a set of proposed formulas to calculate the clearance side interference.

DETAILED DESCRIPTION OF THE PREFERRED EMBODIMENT

The terms "invention," "the invention," and "the present invention" used in this specification are intended to refer broadly to all of the subject matter of this specification and any patent claims below. Statements containing these terms should not be understood to limit the subject matter described herein or to limit the meaning or scope of any patent claims below. Furthermore, this specification does not seek to describe or limit the subject matter covered by any claims in any particular part, paragraph, statement or drawing of the application. The subject matter should be understood by reference to the entire specification, all drawings and any claim below. The invention is capable of other constructions and of being practiced or being carried out in various ways. Also, it is understood that the phraseology and terminology used herein is for the purposes of description and should not be regarded as limiting.

The details of the invention will now be discussed with reference to the accompanying drawings which illustrate the invention by way of example only. In the drawings, similar features or components will be referred to by like reference numbers.

The use of "including", "having" and "comprising" and variations thereof herein is meant to encompass the items listed thereafter and equivalents thereof as well as additional items. The use of letters to identify elements of a method or process is simply for identification and is not meant to indicate that the elements should be performed in a particular order. Although references may be made below to directions such as upper, lower, upward, downward, rearward, bottom, top, front, rear, etc., in describing the drawings, there references are made relative to the drawings (as normally viewed) for convenience. These directions are not intended to be taken literally or limit the present invention in any form. In addition, terms such as "first", "second", "third", etc., are used to herein for purposes of description and are not intended to indicate or imply importance or significance.

Figure 1:
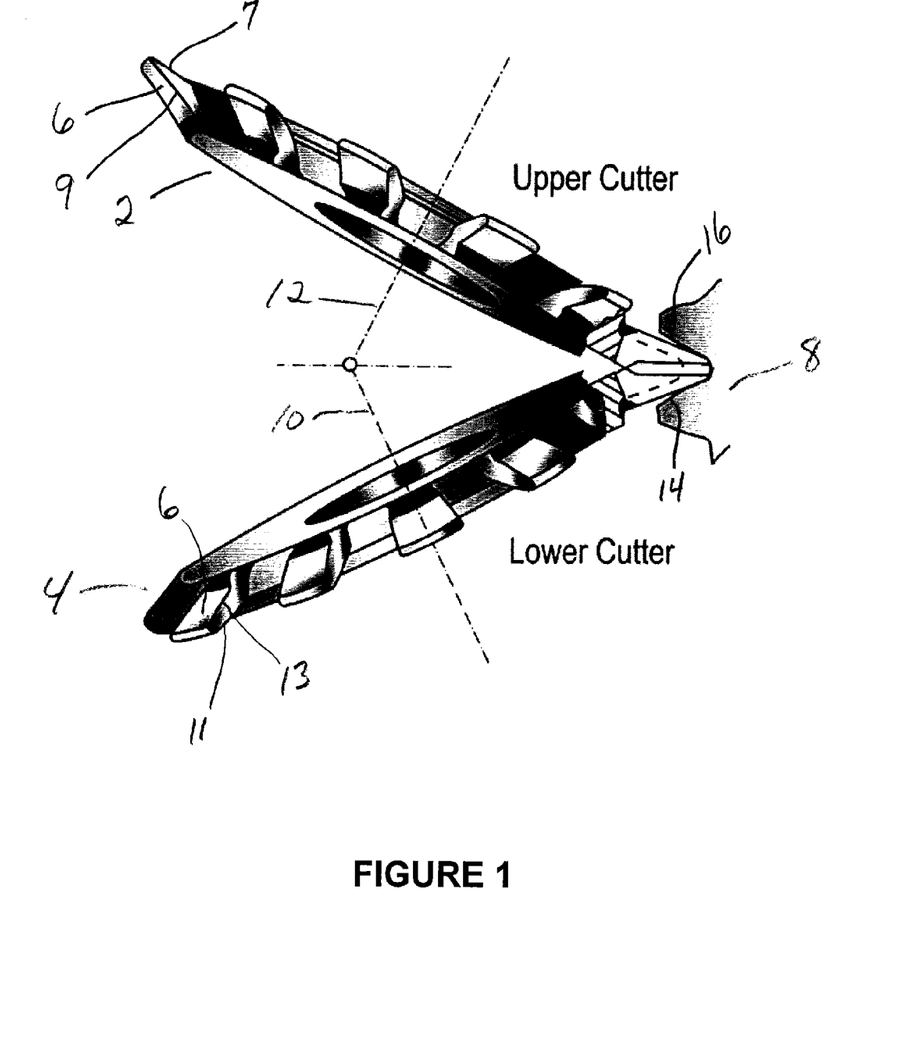
FIG. 1 shows a conventional interlocking cutter arrangement. The upper cutter has cutting edges exposed on the top and the cutter axes are inclined such that the cutting edges represent the pressure angle of a generating rack profile.

FIG. 1 illustrates a conventional arrangement of a pair of inclined rotary disc cutters 2, 4 (commonly referred to as upper and lower cutters, respectively) having cutting blades 6 for cutting a tooth slot in a workpiece 8. Upper cutter 2 is rotatable about axis 12 and lower cutter 4 is rotatable about axis 10. In a generating process on a conventional mechanical cradle-style machine, the inclined cutters 2, 4 are usually fed into the workpiece to a predetermined depth and a generating roll of the machine cradle (not shown) is commenced in a synchronized manner with rotation of the workpiece 8 to generate tooth profile surfaces 14, 16.

The cutters of FIG. 1 comprise an interlocking cutter arrangement of rotary disc cutters. The upper cutter 2 has cutting edges 7 exposed on the top. The cutter axis 12 is inclined such that the cutting edges 7 represent the pressure angle of a generating rack profile. The blade edges 9 on the lower side of the upper cutter 2 are clearance edges, which are not sharp with respect to chip removal and therefore are not suited for participating in the cutting process. The lower cutter 4 has cutting edges 11 exposed to the bottom. The cutter axis 10 is also inclined by the same angle than the upper cutter 2 but in the negative direction. The blade edges 13 on the upper side of the lower cutter 4 are clearance edges, which are not sharp with respect to chip removal and therefore are not suited for participating in the cutting process. Since both cutters 2, 4 are oriented so as to provide an interlocking arrangement, every blade of the upper cutter 2 (with a cutting edge 7 on top) is followed by a blade from the lower cutter 4 (with a cutting edge 11 on the bottom). This type of blade interaction makes provides a completing process, with alternating blades which together cut both sides 14, 16 of one tooth slot in the workpiece 8. During the generating rolling process, the two cutters 2, 4 are kept in their orientation to each other, while they swing around the generating gear axis which is the same as the cradle axis of an older cradle style mechanical machine. It should be understood that for the present invention, the center of roll position is the position where the cutters are symmetrically located within the tooth slot such as shown in FIG. 1.

The inventors have developed of a process that reduces or eliminates the clearance side cutting action on rotary disc cutters such as those shown at 2 or 4 in FIG. 1 if single rotary disc cutters are used such as in the previously mentioned U.S. Pat. No. 7,364,391 for example. In the case of interlocking cutters as in FIG. 1, two separate cutters, one with cutting edges on the bottom side, the second with cutting edges on the top side are working simultaneously to remove chips from a tooth slot similar to alternating cutters.

Figure 2:
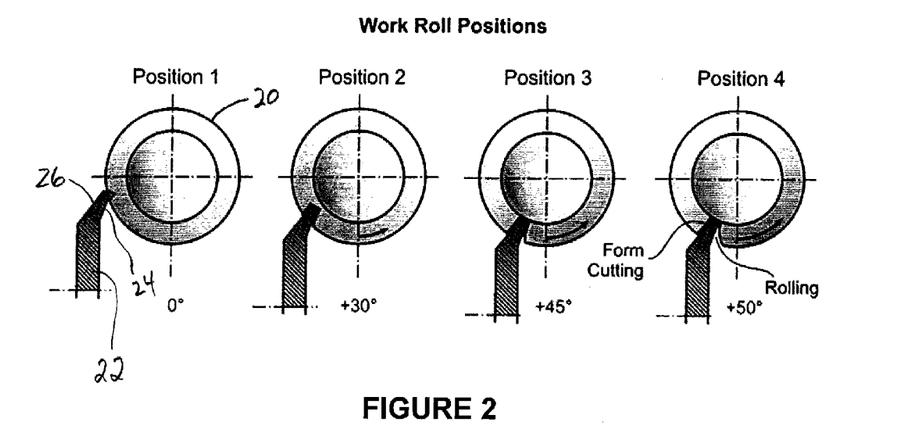
FIG. 2 shows four views onto the cross-section in the middle of the face width of a straight bevel pinion with a peripheral cutter engaged. Only the lower cutter of FIG. 1 is shown which has a horizontal orientation of the cutter axis.
Figure 4:
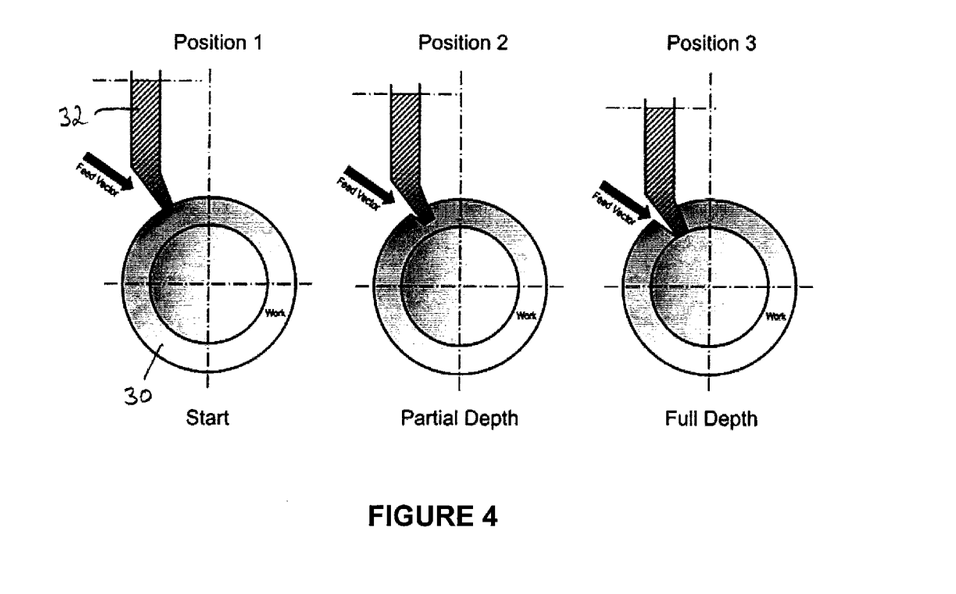
FIG. 4 shows three views onto the cross-section in the middle of the face width of a straight bevel pinion with a peripheral cutter starting to engage in position 1, the cutter being 50% engaged in position 2 and the cutter being fully engaged in position 3. In spite of the rolling process, shown in FIGS. 2 and 3, the cutter is fed into the material along a linear path under a predetermined vector direction.

However, If only one cutter is used in order to rough out a tooth slot and finish roll (i.e. generate) a first tooth flank, then a clearance side cutting action like that shown in FIG. 2, or a severe tip cutting action as shown in FIG. 4, occurs during the roughing portion of the cycle.

FIG. 2 shows four two dimensional views onto the cross section in the middle of the face width of a straight bevel pinion 20 with a peripheral cutter 22 engaged. Only one cutter (e.g. same as the lower cutter 4 of the two cutters in FIG. 1) is shown having a now horizontal orientation of the cutter axis. This is the orientation in a free form machine (e.g. previously discussed U.S. Pat. No. 6,712,566 and U.S. Pat. No. 7,364,391) with horizontal cutter axis and horizontal work axis, which presents the axes configuration required to achieve a rolling process between tool and work with the same relative orientation between tool and work as it is in the mechanical machine with interlocking cutters. A free form machine with a single cutter spindle does not possess the ability to work with a pair of interlocking cutters. The problem therefore is the fact that one single cutter with only sharp cutting edges on one side 24 (i.e. the right side in FIG. 2) has to rough out a tooth slot (cutting on both sides of the blades) and to finish cut (e.g. via a generating roll) a first tooth flank. This requires a form cutting action on the clearance side 26 of the blades. FIG. 2 shows how the left side of the blades after the start work roll position (position 1) to the end work roll position (position 4) is continuously participating on the chip removing process. The cutting edges on the right side of the blades are formed sharp by a side rake angle of, for example, 4° to 12°. The left side of the blades is therefore dull due to a −4° to −12° side rake angle. The left sides of the blades are not well suited for chip removal which leads to poor cutting performance with high part temperature and low tool life. The original (i.e. theoretical) work roll rotation angle is equal the generating gear rotation angle times the ratio of roll (number of teeth on the generating gear/number of teeth on the workpiece).

Figure 3:
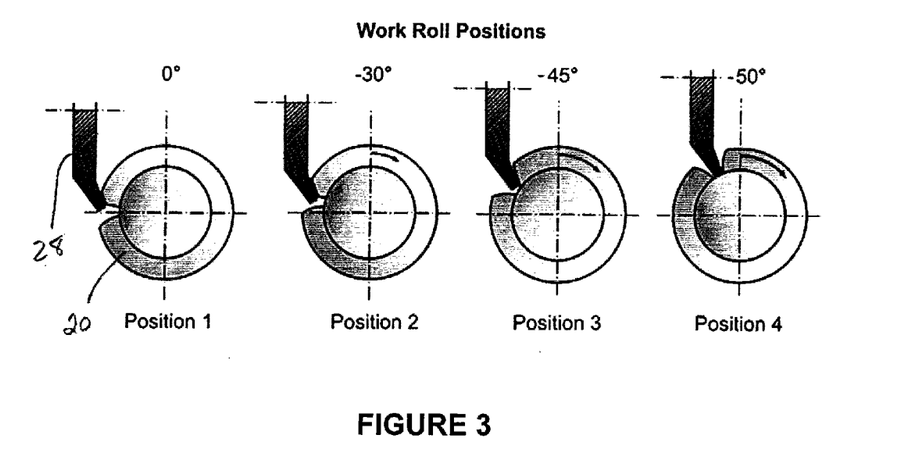
FIG. 3 shows four views onto the cross-section in the middle of the face width of a straight bevel pinion with a peripheral cutter engaged. Only the upper cutter of FIG. 1 is shown which has a horizontal orientation of the cutter axis.

FIG. 3 shows four two dimensional views onto the cross section in the middle of the face width of a straight bevel pinion 20 with a peripheral cutter 28 engaged (e.g. same as the upper cutter 2 of the two cutters in FIG. 1) is shown but now with a horizontal orientation of the cutter axis. This can be the same cutter (i.e. cutter 22) that was used to cut in the lower position in FIG. 2, which can be repositioned by a free form machine in order to also cut and form the second flank. The problem of cutting action on the clearance side of cutting blades as noted in the lower cutting position does not occur in the upper position shown in FIG. 3. Since the slot roughing has already been performed in the lower cutting position, the process in the upper position is limited to finish rolling of the second flank. It is understood that the upper and lower positions could be exchanged. In such a case the lower position would be limited to finish rolling.

FIG. 4 shows three two dimensional views onto the cross section in the middle of the face width of a straight bevel pinion 30 with a peripheral disc cutter 32 starting to engage in the position 1, the cutter being 50% engaged in position 2 and the cutter being fully engaged in position 3. In spite of the rolling process, shown in FIGS. 2 and 3, the cutter is fed into the material along a linear path under a predetermined vector direction. The vector direction is chosen to take chip load away from the dull clearance side blade edge and move this chip load to the sharp cutting edge. The plunging process shown in FIG. 4 is only suitable for the slot roughing. After plunging, a rolling and flank forming with the same cutter occurs in both the lower and the upper position. The vector feed plunging can move some chip load away from the clearance edge, however, it also directs a higher amount of chip load to the blade tips. Vector plunge roughing compared to a "roll only" process leads to a high blade tip wear and still is not capable of eliminating all cutting action on the clearance side blade edge.

The inventors discovered that in case of a "roll only" process (no rough plunging but slot roughing by rolling) the clearance side cutting action can be eliminated by reducing the amount of the work roll (rotation) angle. The work roll angle reduction is preferably achieved by reducing the rate of workpiece rotation (reduced with respect to an original theoretical amount) from the start roll position to and end roll position preferably not beyond the center roll position. A work roll reduction past the center roll position will cause an undercutting of the involute flank function, which makes it difficult in a second roll pass (double roll) to clean up the involute flank surface with a moderate set over. Optimal results can be achieved by utilizing a reduced work rotation rate (i.e. reduced with respect to an original theoretical work rotation rate) from the start roll position to the center roll position, preferably a position $\Delta\phi i$ before the center roll position. The reduced work rotation rate is preferably constant from start roll to center roll positions, but may be varied in this interval. After the work roll reduction end position, the original, not reduced, rate of work rotation is preferably used. Most preferably, $\Delta\phi i$ is a number between 0° and (end roll position—center roll position)/2.

Figure 5:
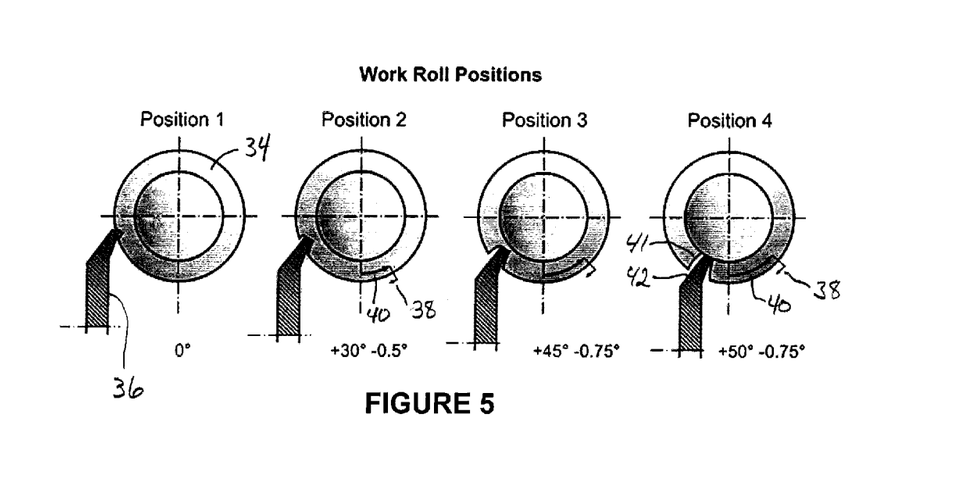
FIG. 5 shows four views onto the cross-section in the middle of the face width of a straight bevel pinion with a peripheral cutter engaged in a lower position as in FIG. 2. The work roll angle from the start work roll (position 1) to the position 3 has been reduced, the amount of reduction being proportional to the amount of work roll from the start.

The reduced work roll rate results in a form cut clearance side as shown in FIG. 5 which provides enough clearance to prevent any clearance side cutting action. The amount of work roll rate reduction is preferably calculated such that enough material on the form cut clearance side is still present in order to form the second flank with a correct slot width in a second (upper) cutting step as shown in FIG. 3.

FIG. 5 shows four two dimensional views onto the cross section in the middle of the face width of a straight bevel pinion 34 with a peripheral cutter 36 engaged in a lower position such as in FIG. 2. The difference between FIG. 5 and FIG. 2 is a reduction 38 of the work roll angle 40 from the start work roll (position 1) to position 3, the amount of reduction preferably being proportional to the amount of work roll from the start although disproportional amounts of work roll reduction are likewise contemplated. For example, in FIG. 5, a work roll reduction rate of −0.25 degrees per 15 degrees of roll motion is shown although the invention is not limited thereto. Thus, at position 3, a work roll reduction angle of −0.75 degree has been achieved for a work roll angle of 45 degrees. At position 3 (which is near to the center roll position) the work roll reduction ends, which means that between position 3 and position 4 the change in work roll is exactly the value calculated (i.e. the original or theoretical amount) from the generating gear (cradle) rotation times the ratio of roll.

Rolling beyond the center roll position (from position 3 to position 4) while continuing with a reduced rate of work rotation will likely lead to an undercut of the root area and thus should be avoided. The work roll reduction between position 1 and position 4 rotates the left side 41 of the tooth slot away from the clearance side 42 of the blade 36, such that the clearance side has no cutting contact during the entire roll of the first flank. The work roll reduction angle 38 has to be large enough to prevent cutting on the clearance side 42 of the blade 36. However, a work roll reduction angle 38 that is too large will open the slot beyond the possibility to form a correct involute and achieve the proper slot width (no clean up in the following step).

Figure 6:
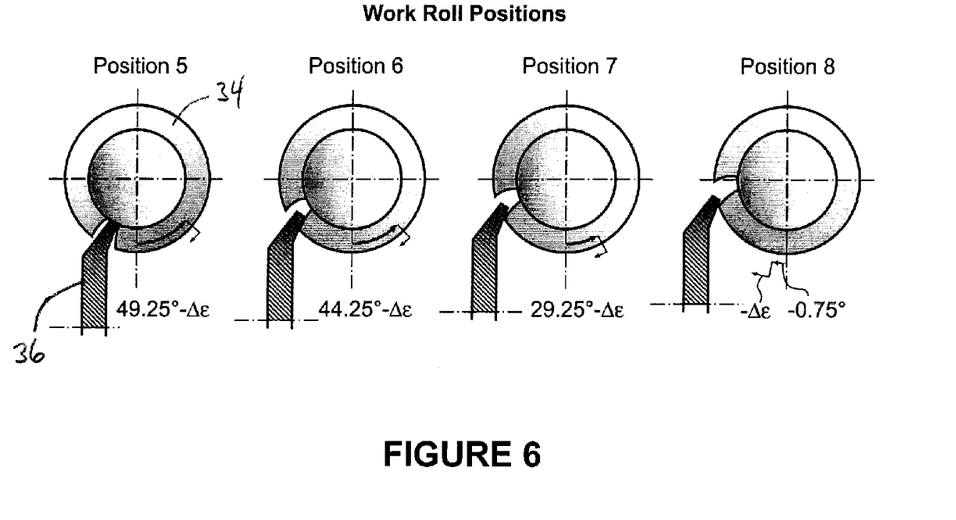
FIG. 6 shows four graphics which accomplish in a reverse rolling mode (second pass of a double roll) the generation of the correct involute profile. After the sequence in FIG. 5, the flank profile is not the desired correct involute, which is caused by the work roll reduction.

After the rough rolling (where the blades have reached the root of the first flank) a set-over of the cutter versus the flank is performed in order to provide stock for a finish roll from root to top, as shown in FIG. 6.

FIG. 6 shows four two dimensional graphics which accomplish in a reverse rolling mode (second pass of a double roll) the generation of the correct involute profile. After the sequence in FIG. 5, the flank profile resulting from the work roll reduction 38 is not the desired correct involute. A set-over (which is a small clockwise work rotation $\Delta\epsilon$) towards the generated flank occurs which is followed by the reverse rolling (position 5 to position 8) which forms the correct profile from the bottom to the top. The set-over amount is between zero and a small amount (e.g. about 10% of the entire work roll reduction angle) to assure surface cleanup. Alternatively, the set-over amount may be a fixed amount (i.e. thickness) of stock material additionally removed from the tooth surface, such as, for example, 0.1 mm.

It should be understood that the "positions" shown in the Figures are for illustrative and explanatory purposes and the invention is not be limited to the number or location of the positions shown.

Figure 7:
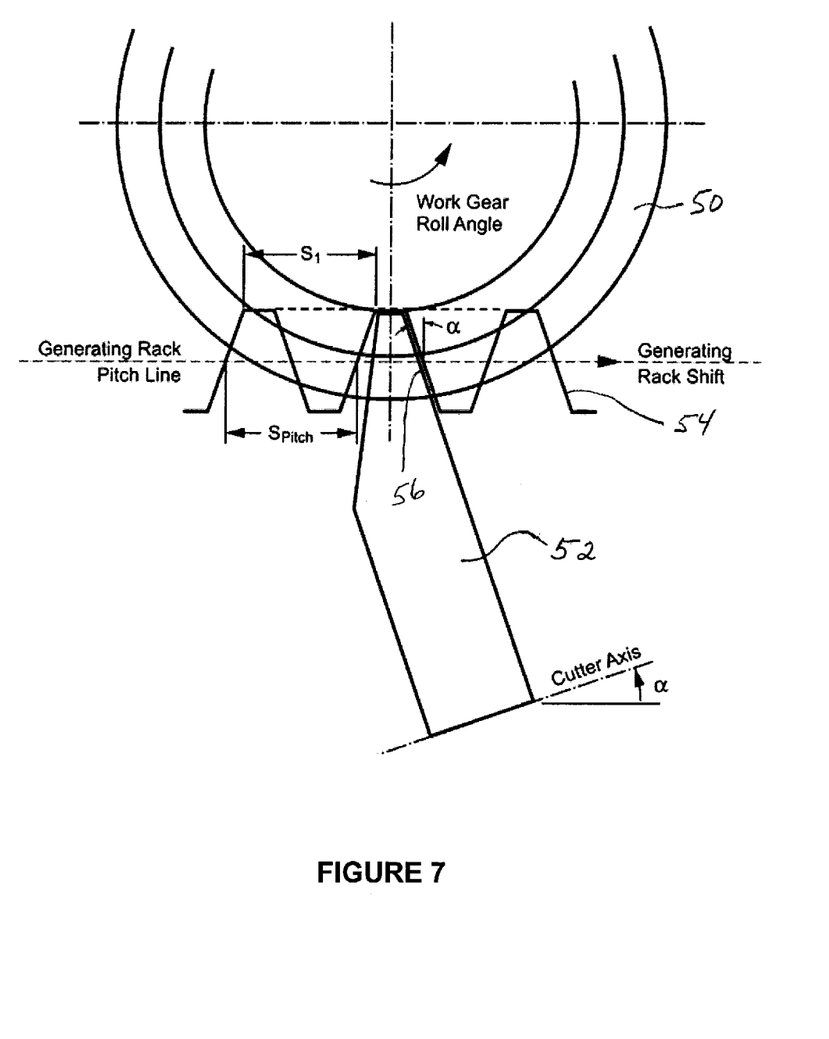
FIG. 7 shows a cross section of the virtual cylindrical gear, which represents the straight bevel gear in its mean section. The cutter blade represents one side of the generating rack which follows the path marked with $s_{Pitch}$ (or $s_1$) during the generation of the involute profile.

FIG. 7 shows a cross section of a virtual cylindrical gear 50 which represents a straight bevel gear in its mean section. The cutter disc 52 represents one side of the generating rack 54 (shown in the center of roll position) which follows the path marked with $S_{Pitch}$ (or $S_1$) during the generation of the involute profile. In the example of FIG. 7, the cutter disc 52 has cutting edges 56 which are perpendicular to the axis of cutter rotation. Since the angle of the generating rack flanks is $\alpha$, and the generating rack is horizontal, the cutter axis has to be inclined by $\alpha$ in order to simulate one flank of the generating rack. The distances $S_1$ and $S_{Pitch}$ in FIG. 7 are preferably identical.

Figure 8:
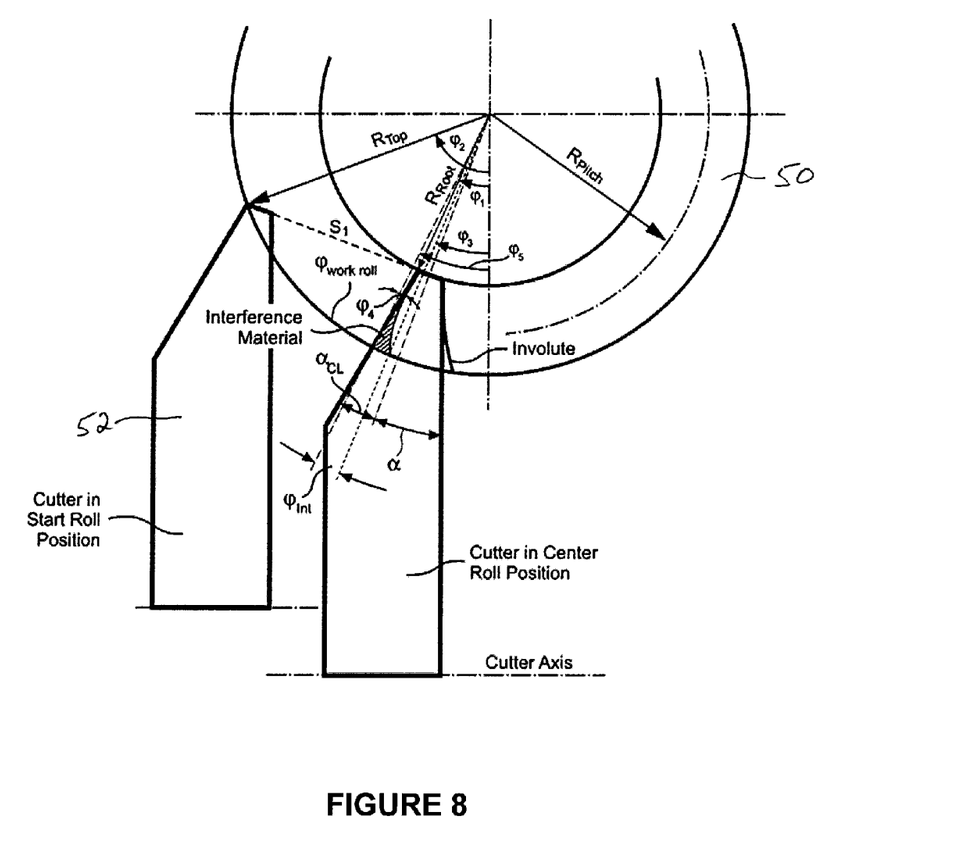

FIG. 8 shows the work and the cutter from FIG. 7 rotated in clockwise direction by an angle $\alpha$ in order to receive a horizontal cutter axis. FIG. 8 shows a number of radii and angles which are used in a set of preferred equations to calculate the clearance side interference. The angle $\phi_{Int}$ indicates the angle of interference between the work material on the clearance side (as cut correctly by the tip of the blade). $\phi_{Int}$ is calculated from the work roll rotation (of the first cut point cut with the clearance side tip) and the location of the blades clearance point at the outside diameter in the center roll position. The interference angle is used for a work roll reduction between the left blade position and the right blade position in FIG. 8.

FIG. 8 shows one possibility for calculating the interference angle $\phi_{Int}$. The interference angle is the angular amount of material on top of the clearance side of the tooth slot which leads to interference with the clearance side of the blade. FIG. 7 and FIG. 8 represent the virtual cylindrical gear of a straight bevel pinion or gear which is calculated from the critical cross section (along the face width). The critical cross section is in mid face or at the heel. The shown calculation is based on the cross section in mid face. The virtual cylindrical gear approximates the profile relationships of the real straight bevel gear and it allows an observation of the profiles in a two-dimensional plane. This calculation is accepted as precise for profile observations and is known such as from, E. Buckingham, *Analytical Mechanics of Gears*, McGraw-Hill Book Company Inc., 1949, pp. 324-328. Referring to the angles marked in FIG. 8, the following formulae can be applied:

Given:
$d_0$ . . . mean pitch diameter
$\gamma$ . . . pitch angle
$h_K$ . . . addendum of real bevel gear
$h_F$ . . . dedendum of real bevel gear
$R_{Pitch}$ . . . pitch radius at mid face
$R_{Top}$ . . . Outside radius at midface
$R_{Root}$ . . . Root radius at midface
$\alpha$ . . . pressure angle of straight bevel gear
$\Delta q$ . . . generating roll from start roll to center roll
RA . . . Ratio of roll between generating gear and work gear $$R_{Pitch} = d_0/(2 \cos \gamma) \quad (1)$$

$$R_{Top} = R_{Pitch} + h_K \quad (2)$$

$$R_{Root} = R_{Pitch} - h_F \quad (3)$$

from the relationship in FIG. 8:

$$R_{Top} \cdot \cos(\phi_2 - \alpha) = R_{Root} \cdot \cos(\phi_1 - \alpha) \quad (4)$$

$$\phi_1 = \alpha + P_W/(2 R_{Root})[\text{rad}] \quad (5)$$

Equation (5) into (4) delivers:

$$\phi_2 = \arccos(R_{Root} \cos(\phi_1 - \alpha)/R_{Top}) + \alpha \quad (6)$$

from geometrical relationship in FIG. 8:

$$S_1 = R_{Top} \sin(\phi_2 - \alpha) - R_{Root} \sin(\phi_1 - \alpha) \quad (7)$$

The gearing law leads to the shifting of a trapezoidal generating rack tangential to the pitch circle of a gear blank (see FIG. 7) in order to generate an involute tooth profile. The work gear rotation is equal to $s/d_0$ [rad] in order to achieve rolling without slippage between the pitch circle of the work gear and the pitch line of the generating rack. A rotation of the work and the cutter disc, drawn in FIG. 7, in clockwise direction by an angle $\alpha$, results in the cutter-work relationship in FIG. 8.

$S_1$ is in the direction of generating gear shift. $S_1$ relates to $\phi_{WorkRoll}$ from start roll to center roll since it is equal $S_{Pitch}$.

work roll angle from start roll to center roll:

$$\phi_{WorkRoll} = S_1/R_{Pitch}(\text{generating law}) \text{ [rad]} \quad (8)$$

$$\phi_3 = \phi_2 - \phi_{WorkRoll} \quad (9)$$

$$\phi_4 = \alpha_{CL} - (\phi_1 - \alpha) \quad (10)$$

$$\phi_5 = \phi_1 + \phi_4 (R_{Top} - R_{Root})/R_{Root} \quad (11)$$

Interference angle from relationship in FIG. 8, using (6) and (11):

$$\phi_{Int} = \phi_2 - \phi_{WorkRoll} - \phi_5 \quad (12)$$

Interference angle per $\phi_{WorkRoll}$ from start roll to center roll results in a sliding factor:

$$f_{Slide} = \phi_{Int}/\phi_{WorkRoll} \quad (13)$$

The sliding factor can be used to calculate modification of work roll angle depending on theoretical work roll angle:

$$\Delta \phi = f_{Slide} \cdot \phi_{WorkRoll} \quad (14)$$

The sliding factor can also be used to calculate a ratio of roll which will include the new sliding rotation in the work gear:

$$\phi_{WorkRoll} = \Delta q \cdot RA \quad (15)$$

$$\phi_{WorkRoll}^* = \Delta q \cdot RA(1 - f_{Slide}) \quad (16)$$

$$RA^* = RA(1 + f_{Slide}) \quad (17)$$

In summary, it is possible to superimpose $\Delta \phi$ to the work roll angles as the process progresses, or to use RA* from start roll to center roll. The calculated angle $\Delta \phi$ will eliminate the severe interference but will not create any clearance between the blades' clearance side and the blank material. In order to eliminate any clearance cutting edge contact by an additional amount, $\Delta \phi_0$ has to be added to $\Delta \phi$. Preferred values for $\Delta \phi_0$ are 5% to 15% of $\Delta \phi (\Delta \phi \cdot 0.05 < \Delta \phi_0 < \Delta \phi \cdot 0.15)$ $$\Delta \phi_{Total} = \Delta \phi + \Delta \phi_0 \quad (18)$$

The gear, shown in FIGS. 7 and 8 is the virtual cylindrical gear of an observed straight bevel gear. The virtual cylindrical gear shows in a two-dimensional representation the same geometrical properties as the real straight bevel gear would show in a profile section (which of course would be a three-dimensional representation). The two-dimensional virtual cylindrical gear profile allows the application of trigonometric expressions in order to make the interference problem on the clearance side of the cutter blades visible and to allow a corrective angle (i.e. a corrective ratio of roll) to be determined.

Rotary disc cutters for the cutting of straight bevel gears generally use a dish angle. In case of a dish angle, the cutting edges are not perpendicular to the cutter axis. The cutter representation in FIGS. 7 and 8 have been drawn without a dish angle. Since the presence of a dish angle changes the pressure angle $\alpha$ used in FIGS. 7 and 8, the graphic would be automatically adjusted to any dish angle introduction. This means also, that the formulas (1) through (16) apply for all dish angles, including 0°.

The calculation shown to determine a corrective work roll reduction is only one possible way to quantify a reduction angle which prevents clearance side interference. More complex calculations (e.g. the generation of the entire clearance side slot surface as it would be generated by the blades' clearance edges and the comparison of this surface with the clearance side of the slot as it is formed by the entire clearance side of the blades (FIG. 2, position 4)) may deliver more accurate results. However, the more precise calculation will not lead to an improved overall result, since a certain percentage of $\Delta \phi$ (mentioned as $\Delta \phi_0$ above) has to be added in order to achieve clearance without any unwanted contact.

The inventive method may also be applied to bevel gear cutting processes with face cutter heads in those cases where only one kind of blades is used for slot roughing and finishing of one flank.

Although the invention has been explained and illustrated with respect to a reduction of the workpiece roll angle during generation of a tooth slot, it follows that the invention may also be achieved by an increase in the amount of roll movement of the rotary disc cutter (increased with respect to an original theoretical amount) during a portion of the generation of a tooth slot.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A method of rough manufacturing a gear tooth on a workpiece, said manufacturing being carried out by a cutting tool having a plurality of cutting blades with each of said cutting blades having a cutting edge and a clearance edge, said method comprising:
    rotating said cutting tool,
    bringing the rotating cutting tool and said workpiece into contact with one another,
    rotating said workpiece,
    moving said cutting tool relative to said workpiece to define a generating roll for generating said gear tooth,
    wherein said rotating of said workpiece comprises rotating the workpiece in a first direction from a start roll position to an end roll position, and wherein said workpiece is rotated at a first rate of rotation less than a theoretical rate of rotation beginning at said start roll position and ending prior to said end roll position,
    or,
    wherein said moving of said cutting tool comprises moving the cutting tool in a first direction from a start roll position to an end roll position, and wherein said cutting tool is moved at a first rate of movement greater than a theoretical rate of movement beginning at said start roll position and ending prior to said end roll position.

2. The method of claim 1 wherein a center roll position is located between said start roll position and said end roll position and wherein said first rate of workpiece rotation occurs between said start roll position and said center roll position.

3. The method of claim 2 wherein said first rate of workpiece rotation ends prior to said center roll position.

4. The method of claim 2 wherein subsequent to said first rate of rotation, said workpiece is rotated at said theoretical rate of rotation to said end roll position.

5. The method of claim 1 wherein no cutting action is performed by said clearance edge.

6. The method of claim 1 wherein subsequent to reaching said end roll position, said workpiece is rotated in an opposite direction while in contact with said cutting tool to provide a finished profile on said gear tooth.

7. The method of claim 6 wherein the workpiece rotation in said opposite direction is carried out at said theoretical rate.

8. The method of claim 6 wherein prior to rotating said workpiece in said opposite direction, a set-over motion of the cutting tool relative to the workpiece is performed.

9. The method of claim 1 wherein said first rate of rotation is constant.

10. The method of claim 1 wherein said first rate of rotation is variable.

11. The method of claim 1 wherein said cutting tool is a rotary disc cutter.

12. The method of claim 11 wherein said rotary disc cutter includes cutting blades oriented at a dish angle.

13. The method of claim 1 wherein said cutting tool is a face cutter.

* * * * *